COMMUNICATION AND PAGING SYSTEM

Filed Oct. 28, 1958

INVENTOR
Oleg C. Enikeieff
BY Mason, Fenwick & Lawrence
ATTORNEYS

United States Patent Office 2,921,141

Patented Jan. 12, 1960

2,921,141

COMMUNICATION AND PAGING SYSTEM

Oleg C. Enikeieff, Silver Spring, Md., assignor to Harry C. Miller Company, Rochester, N.Y., a partnership composed of Harry C. Miller and Gray B. Miller Application October 28, 1958, Serial No. 770,199

3 Claims. (Cl. 179—82)

Figure 1:
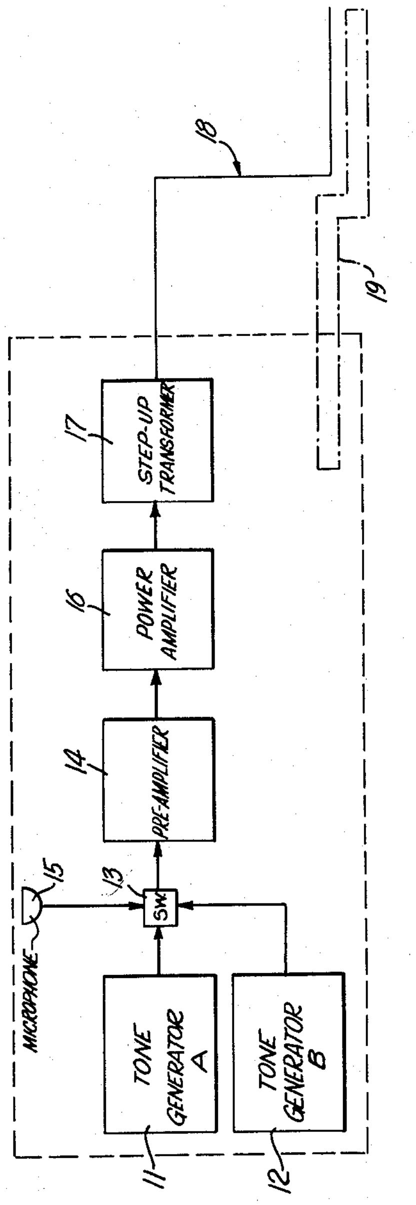

The present invention relates, in general, to communication and paging systems wherein the link between the transmitter and receiver is accomplished by means of a strong audio frequency electric induction field.

The system of the present invention is adapted particularly for use in large size buildings, multi-building plants, and other installations where it may be desired to page selected personnel over an extensive area. It is important, in such systems, that the receiving facility to be carried by the personnel or pagees be extremely light weight and compact, and it is desirable that the system be highly selective so that only the particular person being paged is advised that he is being paged.

An object of the present invention is the provision of a novel communication and paging system which is highly effective to permit selective paging of personnel over a large area, and which permits the use of extremely simple and relatively inexpensive receiver units.

Another object of the present invention is the provision of a novel communication and paging system wherein installation is simplified by relying on a strong audio frequency electric induction field as the link between the transmitter and receivers.

Another object of the present invention is the provision of a novel communication and paging system wherein communication between the pagee and the central paging station is facilitated.

Other objects, advantages and capabilities of the present invention will become apparent from the following detail description, taken in conjunction with the accompanying drawing, illustrating a preferred embodiment of the invention.

Figure 2:
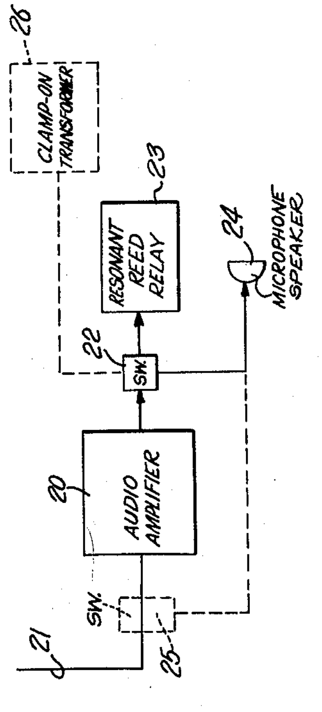

In the drawing:

Figure 1 is a block diagram of a transmitting system for a communication and paging system embodying the present invention; and Figure 2 is a block diagram of a receiver for a communication and paging system embodying the present invention.

Referring to the drawing, the communication and paging system of the present invention employs a transmitting station, generally indicated by the reference character 10, which is designed to produce a high voltage audio signal applied between ground and a conductor system forming, in effect, a condenser plate, which audio signal is of a selected frequency identifying a particular pagee. Such a transmitting station may, for example, comprise a plurality of conventional tone generators, two of which are illustrated in Figure 1 and are identified by the reference characters 11 and 12, which, upon electrical, mechanical or other conventional form of excitation, will produce an audio frequency electrical signal on their associated output leads. The tone generators 11, 12 are each designed to produce a different, selected audio frequency which will be identified with a particular pagee in accordance with conventional coding systems. The outputs of the tone generators 11, 12 may be coupled through a conventional electrical switch 13 to a pre-amplifier 14. As illustrated in Figure 1, a microphone 15 may also be coupled to the switch 13 so that the microphone 15 or any one of the tone generators can be selectively coupled to the pre-amplifier 14 by manipulation of the switch 13. The amplified signal at the output of the pre-amplifier 14 is applied to a power amplifier 16 which may be of the conventional vacuum tube type or of the transistor variety, which in the exemplary embodiment herein described will produce an output of about 150 watts power. It will be appreciated that the power output requirements of the amplifier 16 will be selected in accordance with known engineering principles to provide a suitable output for the particular installation. The output of the power amplifier 16 is then applied to an audio frequency amplifier 17 designed to amplify the signal to a very high voltage level, preferably in excess of 10,000 volts. In the exemplary embodiment herein described, the amplifier 17 should have a frequency response which is essentially flat over a range from about 300 cycles to about 3,000 cycles and will produce an output signal having a voltage level of the order of 20,000 volts. This amplifier 17 may be a step up transformer of the type described in my copending patent application entitled "Microphone Jamming System," which is described as a transformer having a Hypersil core of grain oriented, C core material, a primary winding whose opposite ends are coupled in a conventional manner to the output of the power amplifier 16 and a secondary winding formed, for example, of five series connected secondary winding segments, the lower end of the secondary being connected to ground, and the upper end being connected to a high voltage insulated cable 18 strung, for example, along the halls and rooms of a building in which the system is to operate. The turns ratio is selected in accordance with known engineering principles to provide the desired voltage step up and the entire transformer winding and core assembly may be suitably potted and immersed in transformer oil.

Various forms of audio transformer construction may be available to provide the desired voltage increase and frequency response characteristics as will be apparent to persons skilled in the appropriate art, so that the invention is obviously not limited to use of the particular transformer construction herein described.

By this system, a high voltage audio frequency electric induction field which extends only a limited distance from the field generating cable 18 is produced in a convenient manner, which may be directed through any area and in any desired geometrical configuration to adapt it to cover the desired regions in a plant or building.

The receiver for such a communication and paging system may be of the character illustrated in Figure 2, which comprises a conventional type of audio amplifier 20, which may be a miniaturized transistor amplifier in a compact housing suitable to be carried in the lapel pocket of clothing or the like, having a short bare wire of about three or four inches, indicated by the reference character 21, coupled to the input of the audio amplifier 20 and serving as an antenna. The output of the audio amplifier 20 is preferably coupled through a sub-miniature toggle switch or the like 22 to a resonant reed relay 23 and a miniature speaker 24. By manipulation of the toggle switch 22, the output of the audio amplifier 20 may be applied either to the resonant reed relay 23 or to the speaker 24. The switch 22 will be normally positioned to apply the audio amplifier output to the relay 23. The resonant reed relay 23 of each receiver unit will be tuned to a different frequency corresponding to the audio tone generated by one of the tone generators 11, 12, so that each tone generator will produce a response in only the receiver unit having the relay 23 tuned to its frequency. When it is ncessary to page a particular individual, one of the tone generators 11, 12, producing the particular frequency to which the pagee's receiver is responsive is coupled through the switch 13 to the pre-amplifier 14 of the transmitter 10 to produce a high voltage audio signal on the transmitter cable 18 of the particular audio frequency of the activated tone generator. This produces an aural indication in the form of a buzz or alarm at the receiver having a resonant reed relay 23 tuned to the selected frequency, through the capacitive coupling of the signal from the transmitting cable 18 to the associated antenna 21. If the resonant reed relays 23 of the various receiver units have a very narrow band response, and the frequencies of the tone generators 11, 12 are suitable separated, only one of the receiver units will be activated. The pagee, upon hearing the buzz or alarm, activates the toggle switch 22 to disconnect the resonant reed relay 23 from the audio amplifier output and connect the speaker 24 to the audio amplifier 20. After a predetermined period of time, the operator at the transmitting station manipulates the switch 13 to decouple the tone generator from the pre-amplifier 14 and couple the microphone 15 to the pre-amplifier input, and then broadcasts the desired message.

Since the above described system operates on the electric induction field instead of the magnetic induction field, the field generating cable or facility does not have to be in the form of a large loop surrounding the area to be served, but can consist of a single cable or a plurality of single cables which may extend from the transmitting station in an irregular geometric fashion with no return leads.

If it is desired to arrange the system so that the pagee can send messages back to the transmitting station, the transmitting unit should also have a low impedance continuous closed loop, as, for example, shown in broken lines in Figure 1 and indicated by the reference character 19, which is installed in conjunction with the high voltage field generating cable 18. This loop 19 may wind around the corridors and rooms at a level of approximately three or four feet from the floor. The receiver units may each have a switch such as that indicated by the reference character 25 connecting the input of the audio amplifier 20 with the sub-miniature speaker 24 and a clamp-on transformer, indicated by the reference character 26, for example, of the type illustrated in my co-pending application S.N. 741,658 filed June 12, 1958, may be connected to the switch 22. The arrangement will be such that the pagee may clamp the clamp-on audio transformer 26 onto the loop 19 and, after manipulating the switches 22 and 25 to connect the speaker 24 with the audio amplifier input and the clamp-on transformer 26 with the audio amplifier output, use the speaker 24 as a microphone and induce a responsive signal in the magnetic loop 19. The return signal of the pagee may be picked up at the transmitting station by another clamp-on type transformer associated with an audio amplifier and speaker by inductively coupling the signal in the loop 19 to the audio amplifier at the transmitting station.

While but one specific embodiment of the present invention has been particularly shown and described, it is apparent that various modifications can be made within the spirit and scope of the invention, and it is desired therefore, that only such limitations be placed on the invention as are imposed by the prior art and are set forth in the appended claims.

What is claimed is:

1. A paging system comprising a transmitter including a plurality of tone generators for producing a plurality of distinctive paging signals each having a distinct selected audio frequency to be assigned to a particular pagee, electric induction field generating means including conductors extending from the transmitter through the area to be served by the paging system and terminating remote from the transmitter, means for amplifying the paging signals produced by said tone generators to a high voltage level and applying the same to said conductors to generate an electric induction field along the conductors, a microphone, and switch means for selectively coupling said microphone to the signal amplifying means for applying signals representative of acoustic activation of said microphone to said field generating means, a receiver responsive to the induction field associated with a paging signal including signal amplifying means, antenna means to be capacitively coupled with the transmitter conductors for applying a responsive signal to said amplifier means, alarm means, resonant means tuned to the assigned frequency of a pagee and coupled to said amplifier means to activate said alarm means upon reception of a signal of the assigned frequency by the receiver, a speaker, and switch means for decoupling said resonant means from said amplifier means and coupling said speaker to the output of said amplifier means.

2. In a paging system, a transmitter for activating a plurality of audio frequency sensitive receivers in an area to be served by the paging system including a plurality of tone generators for producing a plurality of distinctive paging signals each having a distinct selected audio frequency to be assigned to a particular pagee, electric induction field generating means including conductors extending from the transmitter through the area to be served by the paging system and terminating remote from the transmitter, means for amplifying the paging signals produced by said tone generators to a high voltage level and applying the same to said conductors to generate an electric induction field along the conductors, a microphone, and switch means for selectively coupling said microphone to the signal amplifying means for applying signals representative of acoustic activation of said microphone to said field generating means.

3. In a paging system, a transmitter for activating a plurality of audio frequency sensitive receivers in an area to be served by the paging system including a plurality of tone generators for producing a plurality of distinctive paging signals each having a distinct selected audio frequency to be assigned to a particular pagee, electric induction field generating means including conductors extending from the transmitter through the area to be served by the paging system and terminating remote from the transmitter, audio amplifier means including a step up transformer for amplifying the paging signals produced by said tone generators to a high voltage level of at least 10,000 volts and applying the same to said conductors to generate an electric induction field along the conductors, a microphone, and switch means for selectively coupling said microphone to the signal amplifying means for applying signals representative of acoustic activation of said microphone to said field generating means.

References Cited in the file of this patent

UNITED STATES PATENTS

| | | |
|---|---|---|
| Re. 23,751 | Clark | Dec. 15, 1953 |
| 2,494,451 | Olson | Jan. 10, 1950 |
| 2,853,557 | Lehman | Sept. 23, 1958 |
| 2,870,435 | Graaf | Jan. 20, 1959 |